United States Patent [19]

Kishita et al.

[11] Patent Number: 5,326,611
[45] Date of Patent: Jul. 5, 1994

[54] COVER-GASKET ASSEMBLY FOR HARD DISK DEVICE

[75] Inventors: Hirofumi Kishita; Kazuhiko Tomaru; Noboru Shimamoto, all of Annaka; Kouichi Yamaguchi, Takasaki; Shinichi Sato, Annaka, all of Japan

[73] Assignee: Shin-Etsu Chemical Co., Ltd., Tokyo, Japan

[21] Appl. No.: 44,624

[22] Filed: Apr. 9, 1993

[30] Foreign Application Priority Data

Apr. 10, 1992 [JP] Japan ................... 4-140908

[51] Int. Cl.⁵ ............................... B32B 3/14
[52] U.S. Cl. ......................... 428/78; 428/450; 428/192; 428/447; 528/31; 528/24; 528/42; 360/97.02; 360/98.08; 277/228; 277/235 A
[58] Field of Search ............... 528/42; 428/447, 192, 428/450, 78; 360/97.02, 98.08; 277/228, 235 A

[56] References Cited

U.S. PATENT DOCUMENTS

| | | | |
|---|---|---|---|
| 4,742,101 | 5/1988 | Yoshida | 524/267 |
| 4,950,521 | 8/1990 | Takamura et al. | 428/78 |
| 4,985,526 | 1/1991 | Kishita et al. | 528/15 |
| 5,037,932 | 8/1991 | Maxson et al. | 528/15 |

FOREIGN PATENT DOCUMENTS 2242485 10/1991 United Kingdom .
2257976 1/1993 United Kingdom .

*Primary Examiner*—John C. Bleutge
*Assistant Examiner*—Margaret W. Glass
*Attorney, Agent, or Firm*—Oblon, Spivak, McClelland, Maier & Neustadt

[57] ABSTRACT

A cover-gasket assembly for a hard disk device which comprises a gasket applied to a predetermined position of a cover for the hard disk device, wherein the gasket is formed essentially of a cured product of a fluorosilicone rubber composition. The assembly is particularly excellent in sealing property against permeation of water vapor, and can be used extremely effectively for hard disk devices for handy office-automation apparatuses such as laptop or pocket-size personal computers, word processors and the like which are expected to be used under various temperature and humidity conditions.

4 Claims, 1 Drawing Sheet

COVER-GASKET ASSEMBLY FOR HARD DISK DEVICE

BACKGROUND OF THE INVENTION

1. Field of the Invention

The present invention relates to a cover-gasket assembly obtained by direct formation and adhesion of a rubber gasket onto a cover member for a hard disk device.

2. Description of the Prior Art

A hard disk device generally comprises hard disks, namely, disks of an aluminum alloy or the like coated with a magnetic material which are enclosed in a sealed container, and magnetic heads each disposed close to the disk, with an about 0.1- to 0.5-$\mu$m gap therebetween, for recording and reproduction of information into and from the disks.

If dust is generated in the sealed container or comes into the container from the outside, therefore, magnetic surfaces of the disks or the magnetic heads can be broken. In order to obviate such troubles, an air circulator comprising a high performance filter is installed in the sealed container to catch dust, whether generated internally or coming from the outside, thereby keeping clean air inside the container.

For preventing the penetration of dust or the like from the outside of the sealed container, however, any gap between a cover and a body of the container must be sealed with a gasket. Therefore, it is necessary for the gasket to have both cleanness such that the gasket itself does not generate dust or the like, and sealing properties sufficient for preventing the external penetration of dust or the like.

As the known gasket of this type, there have hitherto been gasket members molded from, or die-cut from a molded sheet of, neoprene rubber, urethane rubber, silicone rubber, nitrile-butadiene rubber or the like, and gasket members die-cut from foam sheets of these rubbers, polyolefin (e.g., polyethylene) or the like.

In use of these conventional gaskets for constructing a cover-gasket assembly, it has been a common practice to store the gasket with a release paper attached thereto through a pressure sensitive adhesive and thereafter adhere the gasket to a predetermined position of a cover member for a hard disk device by removing the release paper, or to adhere the gasket to the cover member with an adhesive. The use of a pressure sensitive adhesive or an adhesive has been the cause of such troubles as staining of the cover for the hard disk device, generation of dust inside the hard disk device, and the like.

In addition, accurate positioning in adhering the gasket member to a predetermined position of joint between the cover member and the container body of a hard disk device is extremely difficult to accomplish and requires skill, leading to higher manufacturing costs of cover-gasket assemblies.

Furthermore, production of the die-cut gaskets needs cutting dies, and inevitably generates waste sheets (cutting wastes) which cannot be utilized. Thus, there arise an added increase in production cost and difficulties associated with disposal of waste sheets.

The molded gaskets, on the other hand, not only need molds for the production thereof, leading to high production costs, but also have the disadvantage that an unsatisfactory deflashing upon molding will cause generation of dust in the hard disk device.

In consideration of the above, the present inventors have made a proposal to apply a liquid addition-curable type silicone rubber composition, as a gasket, directly to a joint portion of a cover for a hard disk device (Refer to U.S. Pat. No. 4,950,521 and U.S. Pat. No. 5,147,691). According to the proposal, the gasket is formed without using a pressure sensitive adhesive, an adhesive or the like; therefore, the problem of generation of dust inside the hard disk device can be obviated effectively. In addition, neither a cutting die nor a mold is used for obtaining the gasket, which is advantageous economically and offers freedom from the generation of cutting wastes, flashes or the like. Thus, the gasket according to the proposal is highly advantageous over the conventional gaskets.

However, in recent years there is a trend toward the use of hard disks with a sputtered magnetic film thereon and, in addition, the head-disk gaps have come to be set extremely narrow. As a result, there have been an increasing number of cases where troubles at head-disk gaps are caused not only by dust but also by bleedings, bloomings or condensates of volatile components coming out of the gasket material or the like. Of common gasket materials, silicone rubber is said to be the least liable to cause these troubles. Even in the case of silicone rubber gaskets, however, ordinary cured products of silicone rubber have the problem that low molecular weight siloxanes contained in the silicone rubber are evaporated and diffused in the hard disk device and are thereafter recondensed in head-disk gaps, leading to insufficient floating of the head above the disk surface and, eventually, to such troubles as head crash and destruction of magnetic disk surfaces.

Besides, silicone rubbers have comparatively high moisture permeability coefficients on the order of 100 g.mm/m$^2$.24 hr, and are unsatisfactory as to sealing properties against permeation of water vapor. Therefore, use of a silicone rubber gasket for a cover of a hard disk device restricts the environments in which the hard disk device can be used.

SUMMARY OF THE INVENTION

It is accordingly an object of the present invention to provide a cover-gasket assembly for a hard disk device comprising a gasket which shows evaporation of extremely small amounts of low molecular weight substances and has good sealing properties against permeation of water vapor, and a method of producing the same.

It is another object of the present invention to provide a method of producing a cover-gasket assembly for a hard disk device without using a pressure sensitive adhesive, an adhesive, a cutting-die, a mold or the like.

According to the present invention, there is provided a cover-gasket assembly for a hard disk device which comprises a gasket applied to a predetermined position of a cover for the hard disk device, wherein said gasket is formed of a cured product of a fluorosilicone rubber composition.

The cover-gasket assembly according to the present invention is particularly excellent in sealing properties against permeation of water vapor, and can be used extremely effectively for hard disk devices for handy office-automation apparatuses such as laptop or pocket-size personal computers, word processors and the like which are expected to be used under various temperature and humidity conditions.

In addition, according to the invention, it is possible to form a gasket by the FIPG (Formed In Place Gasket) method, that is to say, without needing a mold or a cutting die. Thus, according to the invention, the cover-gasket assembly can be mass-produced extremely advantageously on an economic basis. Moreover, the method according to the invention does not need an adhesion step, so that generation of dust arising from use of a pressure sensitive adhesive or an adhesive can be obviated effectively.

DETAILED DESCRIPTION OF THE INVENTION

Fluorosilicone Rubber Composition

Figure 1:
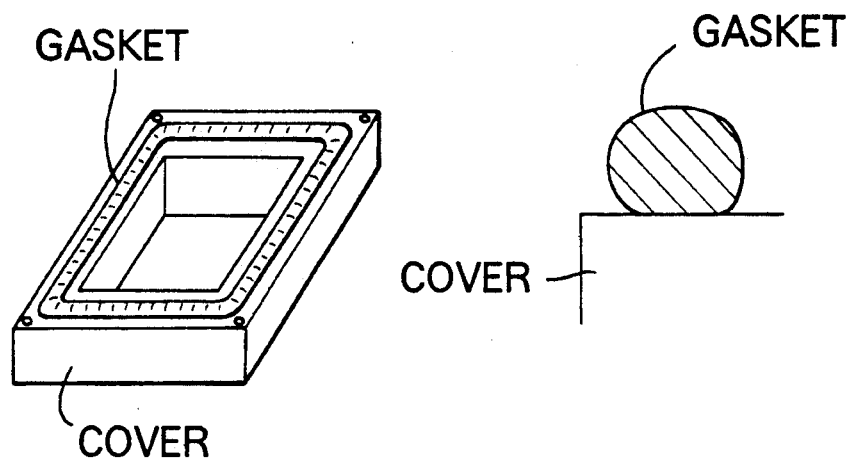
FIG. 1 shows a perspective view of a cover-gasket assembly produced in Example 1, together with a cross-sectional view of the gasket.

In the present invention, a fluorosilisone rubber composition is used as a gasket material. That is, the gasket is formed of a cured product of the composition. The cured product generally has a low coefficient of moisture permeability of 40 g.mm/m$^2$.24 hr or below, normally from 10 to 40 g.mm/m$^2$.24 hr, and hence good sealing properties against permeation of water vapor. Accordingly, a hard disk device comprising the cover-gasket assembly of the present invention can be used without special restrictions as to environmental conditions.

As the fluorosilicone rubber composition, fluorosilicone rubber compositions of any curing type, for example, so-called addition-curing type or condensation-curing type, can be used, provided the compositions have a favorable moisture permeability coefficient. Among the usable fluorosilicone rubber compositions, particularly preferred are those curable compositions comprising (a) a fluorine-containing diorganopolysiloxane, (b) a filler, and (c) a curing agent.

(a) Fluorine-Containing Diorganopolysiloxane

The fluorine-containing diorganopolysiloxanes include, for example, the compounds having the following general formula (1):

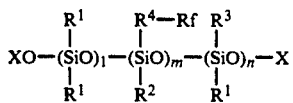  (1)

wherein $R^1$ and $R^2$ may be the same or different from each other and are each an unsubstituted or substituted monovalent hydrocarbon group which does not have aliphatic unsaturated bonds, $R^3$ is a monovalent aliphatic unsaturated hydrocarbon group, $R^4$ is a divalent hydrocarbon group having no aliphatic unsaturated bonds or is a group represented by the following general formula (2):

—R$^5$—O—R$^6$—  (2)

(wherein R$^5$ and R$^6$ are each a divalent hydrocarbon group having no aliphatic unsaturated bonds), Rf is a perfluoroalkyl group or a perfluoroalkyl ether group, X is a hydrogen atom or a group represented by the following general formula (3):

—Si(R$^7$)$_3$  (3)

(wherein R$^7$ may be same or different from each other and are each an unsubstituted or substituted monovalent hydrocarbon group), l and m are each an integer of 1 or above, and n is an integer of 0 or above.

In the general formula (1), preferable examples of the unsubstituted or substituted monovalent hydrocarbon groups R$^1$ and R$^2$ are those having from 1 to 8 carbon atoms. More specific examples include alkyl groups such as methyl, ethyl, isopropyl, butyl, and the like; cycloalkyl groups such as cyclohexyl, cyclopentyl, and the like; aryl groups such as phenyl, tolyl, xylyl, and the like; aralkyl groups such as benzyl, phenylethyl, and the like; halogenated hydrocarbon groups such as chloromethyl, chloropropyl, chlorocyclohexyl, 3,3,3-trifluoropropyl, and the like; cyanohydrocarbon groups such as 2-cyanoethyl, and the like. Among these, particularly preferred in the present invention are methyl, ethyl, phenyl and 3,3,3-trifluoropropyl groups.

The monovalent aliphatic unsaturated hydrocarbon group R$^3$ includes, for example, vinyl, allyl, ethynyl, and the like groups, of which particularly preferred is the vinyl group.

The divalent group R$^4$ located intermediately between a silicon atom and the fluorine-containing organic group Rf is a divalent hydrocarbon group not having a aliphatic unsaturated bond or a group having an ether linkage which is represented by the above general formula (2). Specific examples of the group R$^4$ include —CH$_2$—, —CH$_2$CH$_2$—, —CH$_2$CH$_2$CH$_2$—, —(CH$_2$)$_6$—, —(CH(CH$_3$)CH$_2$)$_2$—, —CH$_2$—O—CH$_2$—, —CH$_2$CH$_2$CH$_2$—O—CH$_2$—, —CH$_2$—O—CH$_2$CH$_2$CH$_2$—, —Y—, —CH$_2$—O—CH$_2$—Y—, (wherein Y is a p-phenylene group), and the like, of which particularly preferred are —CH$_2$CH$_2$—, —CH$_2$CH$_2$CH$_2$—, and —CH$_2$CH$_2$CH$_2$—O—CH$_2$—.

The fluorine-containing organic group Rf is a perfluoroalkyl group or a perfluoroalkyl ether group. The perfluoroalkyl groups which can be used include, for example, those having the following general formula (4):

$C_pF_{2p+1}$—  (4)

wherein p is an integer from 4 to 10, preferable examples including those having the general formula (4) wherein p is 6, 8 or 10.

On the other hand, preferable perfluoroalkyl ether groups for use as the fluorine-containing organic group Rf include those having from 5 to 15 carbon atoms, most preferable examples including
C$_3$F$_7$OCF(CF$_3$)—,
C$_3$F$_7$OCF(CF$_3$)CF$_2$OCF(CF$_3$)—,
C$_2$F$_5$OCF$_2$CF$_2$—,
C$_3$F$_7$OCF(CF$_3$)CF$_2$OCF$_2$—,
C$_3$F$_7$OCF(CF$_3$)CF$_2$OCF$_2$CF$_2$—,
and the like.

In the general formula (1), X is a hydrogen atom or a group represented by the above general formula (3). In the general formula (3), namely, $$-Si(R^7)_3 \quad (3)$$

(wherein $R^7$ may be the same or different from each other and are each an unsubstituted or substituted monovalent hydrocarbon group), the group $R^7$ includes, for example, the monovalent hydrocarbon groups not having an aliphatic unsaturated bond which are mentioned above for $R^1$, and alkenyl groups such as vinyl, allyl, hexenyl, and the like. In the present invention, particularly preferred examples of X include hydrogen atom, $(CH_3)_3Si$—, $(CH_2=CH)(CH_3)_2Si$—, and the like.

In the general formula (1) above, l is an integer of 1 or above, preferably, an integer from 100 to 10,000, and n is an integer of 0 or above.

It is preferable that $m/(l+m+n)$ has a value in the range from 1/50 to 1/3.

In the fluorine-containing diorganopolysiloxane as above, aliphatic unsaturated groups such as vinyl or the like are not necessarily contained in the structural units, as is understood from the value of n in the general formula (1). Such unsaturated group is needed only where curing is accomplished through addition reaction; namely, such unsaturated group is not necessary where curing is carried out by use of an organic peroxide.

The fluorine-containing diorganopolysiloxane is preferably a liquid material having a viscosity at 25° C. in the range from 100 to 10,000,000. Such fluorine-containing diorganopolysiloxanes can be used either singly or in combination of two or more. These fluorine-containing diorganopolysiloxanes can be produced by a method which is known per se. In the present invention, fluorine-containing diorganopolysiloxanes deprived of volatile components by a treatment at a temperature of 100° C. or above and a reduced pressure of $10^{-1}$ mmHg or below, or by extraction with solvent or the like, are preferably used. Particularly preferred for use in the invention are those fluorine-containing diorganopolysiloxanes in which the content of cyclic polysiloxanes with a molecular weight of 3,000 or below is 0.01% by weight or below, preferably 0.005% by weight or below.

(b) Filler

As a filler in the composition according to the present invention, various fillers ordinarily used in general silicone rubber compositions can be used suitably. For example, reinforcing fillers such as fumed silica, precipitated silica, carbon powder, titanium dioxide, aluminum oxide, ground quartz, talc, sericite, bentonite, and the like, fibrous fillers such as asbestos, glass fibers, organic fibers, and the like can be used.

These fillers are generally compounded preferably in an amount of from 10 to 300 parts by weight, more preferably from 20 to 200 parts by weight, per 100 parts by weight of the diorganopolysiloxane of component (a). If the amount of the fillers is less than 10 parts by weight, a satisfactory reinforcing effect is not obtainable. If the amount exceeds 300 parts by weight, on the other hand, mechanical strength of the cured product obtained may be lowered.

(c) Curing Agent

As the curing agent compounded in the fluorosilicone rubber composition for use in the present invention, organic peroxides and organohydrogenpolysiloxanes having at least two silicon-bonded hydrogen atoms in their molecule can be used.

As the organic peroxide, a variety of organic peroxides conventionally used for so-called organic-peroxide crosslinking can be used. Specific examples of the usable organic peroxides include benzoyl peroxide, 2,4-dichlorobenzoyl peroxide, 4-monochlorobenzoyl peroxide, dicumyl peroxide, tert-butyl benzoate, tert-butyl peroxide, 2,5-dimethyl-2,5-bis(tert-butyl peroxy)hexane, cumyl-tert-butyl peroxide, and the like. These may be used either singly or in combination of two or more. The organic peroxides are generally used preferably in an amount of from 0.2 to 5 parts by weight per 100 parts by weight of the component (a).

The above-described organohydrogenpolysiloxane is used for forming a cured product by addition reaction, particularly where the diorganopolysiloxane of the component (a) has an aliphatic unsaturated group. That is, the cured product is formed through addition of SiH groups in the organohydrogenpolysiloxane to the aliphatic unsaturated groups in the component (a).

As the organohydrogenpolysiloxane, any one of organohydrogenpolysiloxanes having at least two silicon-bonded hydrogen atoms their molecule can be used. Particularly, the compounds having the following formulas (c-1) to (c-4):

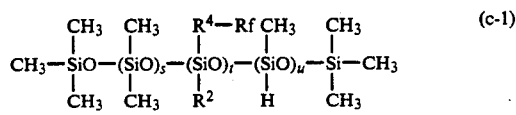

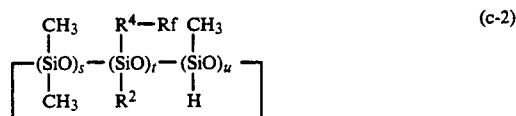

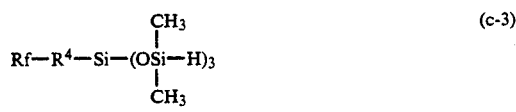

(wherein in the above formulas, $R^2$, $R^4$ and Rf are the same as defined above, s and t are each an integer of 0 or above, and u is an integer of 2 or above), and copolymers comprised of $(CH_3)_2HSiO_{0.5}$ units and $SiO_2$ units are used preferably.

Generally, these organohydrogenpolysiloxanes preferably have a viscosity at 25° C. of 1,000 cSt or below.

The organohydrogenpolysiloxanes are generally used preferably in an amount such that the number of the SiH groups is at least one, more preferably from 1 to 5, per one aliphatic unsaturated hydrocarbon group ($R^3$ in the general formula (1)) in the component (a).

In the present invention, furthermore, where an organohydrogenpolysiloxane is used as the curing agent, a platinum group metal catalyst is used as a curing catalyst. Such catalysts include platinum catalysts, palladium catalysts, and rhodium catalysts. Particularly, platinum catalysts, for example, platinum black, chloroplatinic acid, complexes of chloroplatinic acid with an olefin (e.g., ethylene), alcohol, ether, aldehyde, vinylsilane, vinylsiloxane or the like, catalysts comprising platinum powder supported on an alumina, silica, asbestos or other carrier, and the like are used preferably.

These curing catalysts are generally used preferably in an amount of from 1 to 500 ppm, particularly from 5 to 20 ppm, in terms of platinum group metal based on the component (a).

Other Components

Into the fluorosilicone rubber composition comprising the above-described components (a) to (c), various additives which are known per se can be compound, provided that they do not produce bad effects on the moisture permeation resistance of the cured product obtained from the composition. For instance, dispersing agents such as diphenylsilanediol, hydroxyl-endblocked low-molecular-weight dimethylpolysiloxanes, hexamethyldisilazane and the like, thermal resistance improving agents such as ferrous oxide, ferric oxide, cerium oxide, iron octylate and the like, coloring agents such as pigments, and the like can be compounded, as required.

Besides, in order to further enhance the adhesion between the fluorosilicone rubber composition used in the present invention and the cover member, adhesion aids such as the compounds having the following formulas:

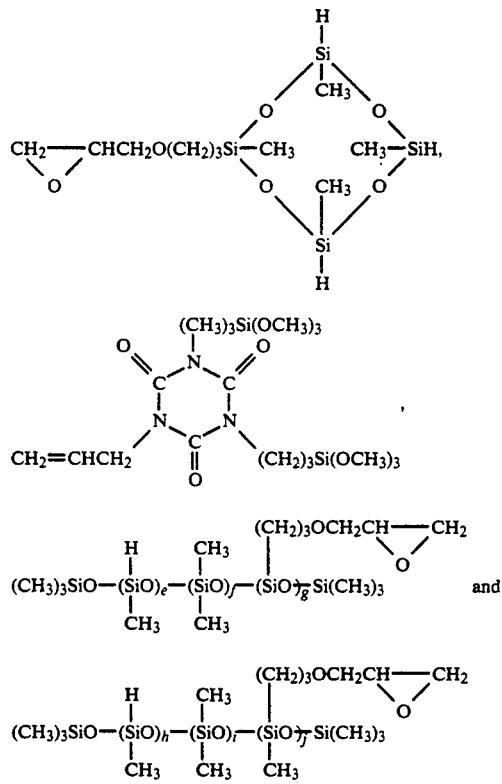

(wherein in the above formulas, e, f, g, h, i and j are each a positive integer) can be compounded in the composition, as required. These adhesion aids generally are used preferably in an amount of from 0.01 to 5 parts by weight per 100 parts by weight of the component (a).

The fluorosilicone rubber composition used in the present invention can be prepared easily by uniformly mixing necessary components described above. In general, however, in order to ensure that the composition retains its as-applied shape after application to a cover member, it is preferable to control the viscosity of the composition at 25° C. to within the range from 100 to 10,000,000 cSt by regulating the amounts of the components in the above-described respective ranges. Besides, for reducing stress loads on the cover member attached to a predetermined container, it is preferable to regulate the amount of the curing agent compounded in the composition so that the cured product of the composition has a hardness Hs (measured on a Type A spring hardness tester according to JIS K 6301) in the range from 10 to 60. It is also preferable that the cured composition is so conditioned that the content of cyclic polysiloxanes with a molecular weight of 3,000 or below is 0.01% by weight or below, more preferably 0.005% by weight or below.

Production of Cover-Gasket Assembly

The cover-gasket assembly for a hard disk device according to the present invention is produced by applying the above-described fluorosilicone rubber composition to a predetermined position of a cover for the hard disk device and then curing the composition.

The fluorosilicone rubber composition used in the present invention can be conveyed by a pump, and the application and curing of the composition, for instance, can be carried out by an FIPG (Formed In Place Gasket) method, in which a combination of a coating robot, a feed pump and a dispenser is used. That is, according to the FIPG method, the fluorosilicone rubber composition is supplied to a predetermined position by the feed pump, is then ejected onto a cover member by the dispenser and, simultaneously, applied by the coating robot in accordance with a preliminarily stored pattern, and is cured to form a gasket.

The gasket formed in this manner can be made to have a semi-circular, flat or other cross-sectional shape, by controlling suitably the ejection conditions for the rubber composition.

According to the method, the position at which the gasket is formed can be set with extremely high accuracy.

The curing of the composition is carried out quickly by heating or the like, as required. After the cure, if necessary, a cleaning treatment such as washing with water, cleaning with air stream, drying and the like is carried out.

The cover-gasket assembly thus obtained is united to a hard disk container by fastening with screws or the like, whereby a hard disk device is produced. Because the cured product constituting the gasket has an appropriate hardness, stresses exerted on the cover are reduced effectively.

In addition, the gasket has an extremely low coefficient of moisture permeability and, hence, good sealing properties against permeation of water vapor.

EXAMPLES

Examples of the present invention will now be described below, in which "parts" means "parts by weight".

Composition Example 1

One hundred (100) parts of a fluorosilicone oil having the following formula:

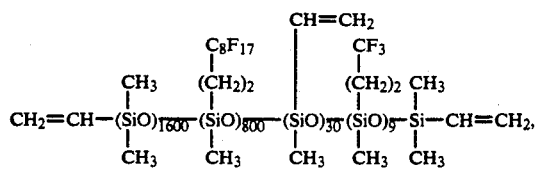

0.5 part of 2,4-dichlorobenzoyl peroxide (curing agent), 30 parts of trimethoxysiloxyl-treated fumed silica (reinforcing agent), 0.5 part of carbon black (coloring agent) and 1.0 part of cerium dioxide (thermal resistance improving agent) were mixed uniformly, to prepare a fluorosilicone rubber composition having a viscosity at 25° C. of 800,000 cSt.

The composition, after cured at 150° C. for 60 minutes, had general physical properties and a moisture permeability coefficient as shown in Table 1.

Measurements of the general properties of the cured product were carried out according to JIS K 6301, and measurement of moisture permeability coefficient was carried out according to the condition B (temperature: 40°±0.5° C.; relative humidity: 90±2%) of JIS Z 0208.

Composition Example 2

One hundred (100) parts of a fluorosilicone rubber having the following formula:

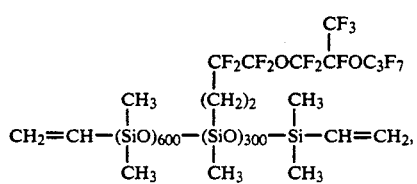

1.4 parts of an organohydrogenpolysiloxane (curing agent) having the following formula:

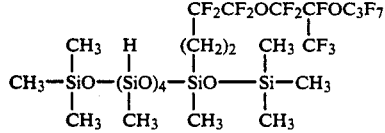

0.5 part of an alcoholic 2 wt. % solution of chloroplatinic acid (curing catalyst), 15 parts of trimethoxysiloxyl-treated fumed silica (reinforcing agent), 0.5 part of carbon black (coloring agent), and 0.7 part of cerium dioxide (thermal resistance improving agent) were mixed uniformly, to prepare a fluorosilicone rubber composition having a viscosity at 25° C. of 1,000,000 cSt.

The composition, after cured at 150° C. for 60 minutes, had general properties and a moisture permeability coefficient as shown in Table 1.

TABLE 1

| Properties of cured product | Composition Example 1 | Composition Example 2 |
| --- | --- | --- |
| General properties: | | |
| Hardness | 50 | 25 |
| Elongation (%) | 300 | 350 |
| Tensile strength (kg/cm$^2$) | 48 | 37 |
| Tear strength (kg/cm$^2$) | 9 | 7 |
| Moisture permeabiliy coefficient (g · mm/m$^2$ · 24 hr) | 30 | 35 |

Hardness measurement was carried out on a Type A spring hardness tester according to JIS K 6301.

EXAMPLE 1

Using an FIPG machine equipped with a coating robot (produced by Yasukawa Denki Seisakusho K.K., product code: K10S), a feed pump (produced by Hyoshin Sobi K.K., product code: 3NTL-08/Mark II) and a dispenser (Hyoshin Sobi K.K., product code 4NDP-04), the fluorosilicone composition prepared in the above Composition Example 1 was applied, in accordance with a preliminarily stored pattern, to an aluminum top cover whose surface had been coated with an epoxy resin by cationic electrode-position coating.

The coating by the FIPG machine was carried out under the conditions of a dispenser nozzle inside diameter of 1.69 mm, a dispenser rotor revolution frequency of 30 rpm, a coating rate of 200 cm/min, and a dispenser nozzle height (from the cover surface) of 2.20 mm.

After the coating operation was over, the composition was cured by maintaining it in a hot-air dryer at 150° C. for 60 min.

After the curing was completed, the cover was taken out of the dryer and was cooled to room temperature, whereby a gasket having a semi-circular cross-sectional profile 1.50 mm in height and 2.00 mm in width was formed.

A perspective view of the cover-gasket assembly thus obtained is shown in FIG. 1, together with a cross-sectional view of the gasket.

In the cover-gasket assembly, the gasket formed was adhered to the cover satisfactorily firmly.

The cover-gasket assembly was washed with purified water conditioned by use of a 0.5 μm filter to have an electric conductivity of 10 μS or below, and was air dried in a room having a cleanliness of 100 (0.3 μm). Subsequently, while maintaining this cleanliness, the cover-gasket assembly was united to a hard disk container, thereby fabricating a hard disk device.

The hard disk device thus obtained was excellent in cleanness. When the atmosphere inside the device was pressurized to 100 mmH$_2$O and the internal pressure was measured after a lapse of time of 1 min, the pressure value was 99 mmH$_2$O, indicating good sealing performance of the device.

EXAMPLE 2

Using the same FIPG machine as in Example 1, the fluorosilicone composition prepared in Composition Example 2 was applied to an aluminum top cover equivalent to that used in Example 1. The coating operation was carried out under the conditions of a dispenser nozzle inside diameter of 1.30 mm, a dispenser rotor revolution frequency of 25 rpm, a coating rate of 100 cm/min, and a dispenser nozzle height (from the cover surface) of 1.0 mm.

After the coating was over, the composition was cured in a hot-air dryer at 160° C. for 60 min.

After completion of the curing, the cover was taken out of the dryer and cooled to room temperature, whereby a gasket having a flat-top cross-sectional profile 1.0 mm in height and 1.5 mm in width was formed.

Figure 2:
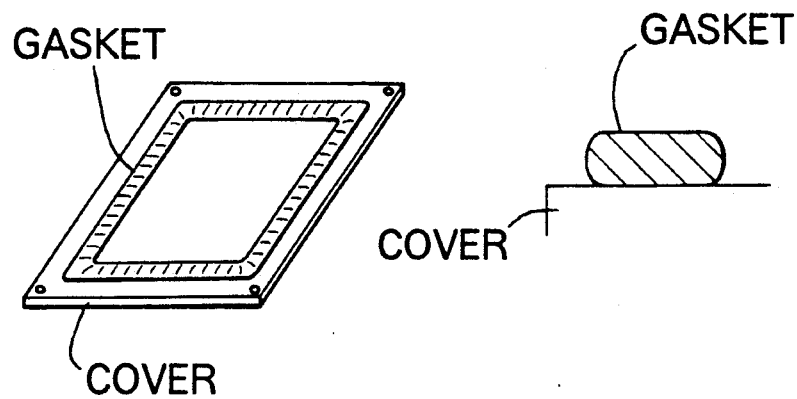
FIG. 2 shows a perspective view of a cover-gasket assembly produced in Example 2, together with a cross-sectional view of the gasket.

A perspective view of the cover-gasket assembly thus obtained is shown in FIG. 2, together with a cross-sectional view of the gasket.

In the cover-gasket assembly, the gasket formed was found in satisfactorily firm adhesion to the cover.

When the cover-gasket assembly was washed in the same manner as in Example 1 and a hard disk device was fabricated using the assembly, the hard disk device obtained was also excellent in cleanness and sealing performance.

We claim:

1. A cover-gasket assembly for a hard disk device, comprising a gasket applied to a predetermined position of a cover for the hard disk device, wherein said gasket is formed essentially of a cured product of a liquid fluorosilicone rubber composition having a water vapor permeability coefficient of 40 g.mm/m$^2$.24 hr or below, wherein said liquid fluorosilicone rubber composition comprises:

(a) a fluorine-containing diorganopolysiloxane having the following general formula (1):

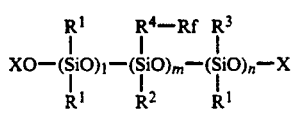
(1)

wherein $R^1$ and $R^2$ may be the same or different from each other and are each an unsubstituted or substituted monovalent hydrocarbon group which does not have aliphatic unsaturated bonds, $R^3$ is a monovalent aliphatic unsaturated hydrocarbon group, $R^4$ is a divalent hydrocarbon group having no aliphatic unsaturated bonds or is a group represented by the following general formula (2):

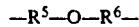
(2)

wherein $R^5$ and $R^6$ are each a divalent hydrocarbon group having no aliphatic unsaturated bonds, Rf is a perfluoroalkyl group of from 4 to 10 carbon atoms or a perfluoroalkyl ether group of from 5 to 15 carbon atoms, X is a hydrogen atom or a group represented by the following general formula (3):

—Si(R$^7$)$_3$   (3)

wherein $R^7$ may be the same or different from each other and are each an unsubstituted or substituted monovalent hydrocarbon group, l and m are each an integer of 1 or above, and n is an integer of 0 or above, and further, wherein said fluorine-containing diorganopolysiloxane comprises cyclic siloxanes having a molecular weight of 3,000 or below in a concentration of 0.01% by weight or below;

(b) a filler; and (c) a curing agent.

2. The cover-gasket assembly according to claim 1, wherein in said general formula (1), $R^1$ and $R^2$ are each a monovalent hydrocarbon group of from 1 to 8 carbon atoms, $R^3$ is a vinyl group, and $R^4$ is a divalent group selected from the group consisting of:

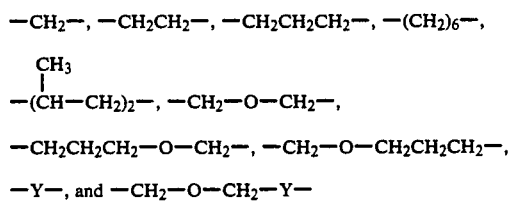

is a p-phenylene group.

3. The cover-gasket assembly according to claim 1, wherein in said general formula (1), m, l and n are integers such that m/(l+m+n) has a value in the range from 1/50 to 1/3.

4. The cover-gasket assembly according to claim 1, wherein said curing agent is an organic peroxide or an organohydrogenpolysiloxane having at least two silicon-bonded hydrogen atoms in its molecule.

* * * * *